(12) United States Patent
Karwaczynski (10) Patent No.: US 6,935,590 B2
(45) Date of Patent: Aug. 30, 2005

(54) SENSOR FOR A FEEDBACK CONTROL SYSTEM

(75) Inventor: Krzysztof W. Karwaczynski, Sterling Heights, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 10/440,698

(22) Filed: May 19, 2003

(65) Prior Publication Data

US 2004/0232268 A1 Nov. 25, 2004

(51) Int. Cl.$^7$ ............................................... B60R 22/34
(52) U.S. Cl. .................. 242/390.8; 280/807; 242/390.9
(58) Field of Search ........................... 242/390.8, 390.9, 242/413.5, 420.6; 280/806, 807; 297/475–478

(56) References Cited

U.S. PATENT DOCUMENTS

| | | | |
|---|---|---|---|
| 3,182,923 A | | 5/1965 | Botar |
| 4,261,530 A | | 4/1981 | Asai et al. |
| 4,489,804 A | | 12/1984 | Kamijo |
| 4,511,097 A | * | 4/1985 | Tsuge et al. ............. 242/390.9 |
| 4,529,143 A | | 7/1985 | Kanada et al. |
| 4,534,441 A | | 8/1985 | Kamijo et al. |
| 4,546,933 A | | 10/1985 | Kanada et al. |
| 4,570,872 A | | 2/1986 | Tsujimura et al. |
| 4,588,144 A | | 5/1986 | Nishimura |
| 4,597,587 A | | 7/1986 | Yoshitsugu et al. |
| 4,616,141 A | | 10/1986 | Hollowell |
| 4,676,444 A | | 6/1987 | Nishimura et al. |
| 4,714,274 A | | 12/1987 | Nagashima |
| 4,741,491 A | * | 5/1988 | Andersson et al. ......... 242/383 |
| 4,741,556 A | | 5/1988 | Nagashima |
| 4,966,394 A | * | 10/1990 | Thomas et al. ............ 280/807 |
| 4,974,876 A | | 12/1990 | Svensson et al. |
| 4,978,087 A | | 12/1990 | Tauber |
| 5,005,777 A | | 4/1991 | Fernandez |
| 5,181,739 A | * | 1/1993 | Bauer et al. ................ 280/807 |
| 5,277,373 A | * | 1/1994 | Morton ..................... 242/413.5 |
| 5,294,066 A | * | 3/1994 | Lacour ..................... 242/390.9 |
| 5,316,233 A | | 5/1994 | Hiramatsu |
| 5,328,120 A | | 7/1994 | Schmid |
| 5,395,066 A | * | 3/1995 | Yokoyama et al. ......... 242/334.2 |
| 5,505,399 A | | 4/1996 | Schmid et al. |
| 5,529,258 A | | 6/1996 | Dybro et al. |
| 5,611,497 A | | 3/1997 | Krambeck et al. |
| 5,725,174 A | * | 3/1998 | Kothmeier ................ 242/413.5 |
| 5,765,774 A | * | 6/1998 | Maekawa et al. ......... 242/390.9 |

(Continued)

FOREIGN PATENT DOCUMENTS

| | | |
|---|---|---|
| DE | 37 27 929 | 1/1989 |
| EP | 0 800 970 | 12/2001 |
| GB | 1 210 323 | 10/1970 |
| GB | 2 292 304 | 2/1996 |
| GB | 2 312 827 | 11/1997 |
| JP | 62 275861 | 11/1987 |

Primary Examiner—John M. Jillions
(74) Attorney, Agent, or Firm—Sally J. Brown (57) ABSTRACT

A flexible member sensor for detecting motion and tension of a flexible member includes a rigid member pivotally connected to a base, in contact with the flexible member. A sensor detects pivotal motion of the rigid member in response to movement of the flexible member. The sensor may provide a corresponding signal to a motion control system that adjusts the tension of the flexible member accordingly. In one implementation, the flexible member sensor is integrated with a feedback control system for an electric seat belt retractor that includes a feedback control loop. The flexible member sensor measures tension in seat belt webbing retained by the retractor. A motor coupled to a servo amplifier rotates a spool of the electric retractor to extract or retract webbing in accordance with the output of the flexible member sensor. The seat belt tension may thus be continuously maintained at a desired level.

32 Claims, 4 Drawing Sheets

U.S. PATENT DOCUMENTS

| | | | |
|---|---|---|---|
| 5,890,672 A * | 4/1999 | Alexander et al. | 242/413.5 |
| 6,305,145 B2 * | 10/2001 | Suolahti | 242/420.6 |
| 6,447,011 B1 * | 9/2002 | Vollimer | 280/806 |
| 6,726,249 B2 * | 4/2004 | Yano et al. | 242/390.9 |
| 2001/0025735 A1 | 10/2001 | Midorikawa et al. | |
| 2002/0125360 A1 * | 9/2002 | Peter | 242/390.8 |
| 2002/0180201 A1 | 12/2002 | Nye et al. | |
| 2003/0066923 A1 * | 4/2003 | Peter | 242/390.8 |
| 2004/0017073 A1 * | 1/2004 | Pavlov et al. | 280/806 |
| 2004/0021029 A1 * | 2/2004 | Eberle et al. | 242/390.9 |

* cited by examiner

SENSOR FOR A FEEDBACK CONTROL SYSTEM

BACKGROUND OF THE INVENTION

1. Field of the Invention

The present invention relates to sensors. More specifically, the invention relates to a sensor and feedback control system for monitoring tension within a flexible member.

2. Description of Related Art

Sensors may be used in various applications. Generally, sensors are used to detect a particular condition or a change in an existing condition. Sensors may be classified based on the property detected or the manner in which detection is accomplished. For example, sensors may be classified as mechanical, optical, electrical, environmental, and the like.

Sensors are often used in control systems to activate a function or response based on the condition detected by the sensor. A "control system" may be defined as a system in which an operation is to be performed (or omitted) in a manner determined by measuring some characteristic of the system. For example, in response to detection of low lighting by a sensor, lighting may be activated. Similarly, in motion control applications, the sensors are typically on the motor or actuating device. In response to the sensor detecting a certain speed or position of the active motor, the motor may be controlled to increase or decrease the speed or change the position.

Thus, efficient operation of the system can be maintained despite relatively unpredictable changes in the system. The present invention has application to a wide variety of control systems. More precisely, there are many applications in which it may be desirable to monitor and/or automatically adjust the tension in a flexible member. One such application is safety restraints for protecting vehicle occupants from impact. Such restraints are often known as "seat belts."

Seat belts are known to increase the safety of occupants in motorized vehicles. Seat belt use is often cited as the most useful line of defense in reducing accident related injuries. Legislation requiring manufacturers to include seat belts in their vehicles has been in place for many years. More recently, laws have been enacted requiring consumers to use seat belts.

The benefits of seat belt use are numerous. In a collision, seat belts may prevent the occupant of a vehicle from striking the interior of the vehicle or other objects within the vehicle, including other occupants. Seat belts aid in keeping the occupant inside the vehicle during a roll-over or other accident situation to enhance the probability of survival and injury avoidance. Seat belts may also keep the driver behind the wheel and in control of the vehicle prior to an impending or potential collision, averting additional damage or injuries. Seat belts also enhance the effectiveness of other safety devices. For example, in a vehicle with airbags, a seat belt keeps the occupant in the seat so that the airbag can better protect the occupant.

Seat belts vary in their configuration, but one common type of seat belt is the three point safety harness. A three point safety harness includes a lap belt and a shoulder strap that cooperate to anchor an occupant on each side of his/her lap and at one shoulder. In one commonly employed three-point safety harness configuration, the seat belt webbing traverses the occupant's upper body in a diagonal fashion, passes through a latch plate, and then traverses the occupant's lap. The latch plate is fastened to a buckle, which is secured to the vehicle to restrain both the occupant's lower and upper body. One end of the webbing is typically anchored to the vehicle. The other end is secured by a seat belt retractor.

For convenience and due to variations in seat position and occupant size, three point safety harnesses are usually adjustable to provide proper safety and comfort. A seat belt retractor allows the safety harness to be adjustable and to lock the webbing in the event of an accident. Conventional seat belt retractors include webbing anchored at one end to a spool. Rotation of the spool is controlled for extraction and retraction of the webbing by a combination of various ratchet wheels, springs, lock dogs, pawls, gears, and the like.

Preferably, in a three-point safety harness, the shoulder strap rests lightly on the occupant's shoulder and allows the occupant to his or her upper torso relatively freely. However, many occupants fail to properly adjust the tension in the safety harness once the seat belt has been fastened. If too much slack is left in the shoulder strap portion of the webbing, the shoulder seat belt system may not properly protect the occupant. Therefore, seat belt retractors have been designed to automatically remove excess slack from the shoulder strap. Generally, this is done by providing a constant bias on the spool in the direction of webbing retraction. However, in actual application, seat belt systems usually contain substantial slack, often 120 mm or more. This is clearly not ideal in that the slack can defeat the effectiveness of the seat belt in a crash situation.

In addition, removal of slack can often cause the occupant discomfort. This discomfort may cause an occupant to use the seat belt improperly, for example, by placing the shoulder portion behind their upper torso, or by simply not using the seat belt. The safety features of the three-point safety harness are defeated when discomfort leads occupants to misuse or avoid using the system.

Generally, the difficulty with existing seat belt systems can be summarized as inability to adequately and dynamically adjust to the position of the occupant. An ideal seat belt system should be able to restrain an occupant comfortably during normal operation. This, however, requires constant adjustment because the occupant is constantly mobile, moving and reaching about the interior of the vehicle. Conventional systems are unable to freely and constantly adjust and often result in uncomfortable binding if the occupant makes a substantial move.

Hence, conventional seat belt systems are lacking in a number of respects, and a need exists for enhanced seat belt systems that overcome the shortcomings of the prior art. More generally, there is a need for control systems capable of adjusting the available length of a flexible member depending on tension present within the member. Conventional control systems generally lack the ability to dynamically and accurately control the tension. There is a need for control systems capable of controlling tension, particularly in the presence of relatively unpredictable factors such as the motion of a vehicle passenger.

In addition to seat belt retractors, many other applications could benefit from the inclusion of enhanced sensing and control system technology. Sensors may be used in a variety of applications in which a load is to be moved in a controlled fashion, particularly through the use of a flexible member. These applications may relate to vehicles, machinery, home automation, and a number of other fields.

SUMMARY OF THE INVENTION

The apparatus and method of the present invention have been developed in response to the present state of the art, and in particular, in response to problems and needs in the art that have not yet been fully solved by currently available sensors and control systems. More specifically, a flexible member sensor is provided that senses movement of the flexible member based on motion of a pivotable rigid member in contact with the flexible member. Movement of the rigid member provides a signal indicating a change in position and/or tension of the flexible member.

Such a flexible member sensor may provide a number of benefits. The pivotable rigid member may be in direct contact with the flexible member such that minor changes in tension within the flexible member are detected by the flexible member sensor. In addition, the flexible member sensor contacts the flexible member in such a manner that the sensor does not significantly interfere with normal movement and changes in tension within the flexible member. In certain embodiments, the flexible member sensor may be integrated with a guide that aides in providing operational movement of the flexible member. In the present invention, embodiments of flexible member sensors may be used in various applications in which tension changes in a belt or other flexible member are to be measured. For example, the present invention is well adapted for use in a seat belt system.

According to one embodiment, the flexible member sensor includes a rigid member, such as an arm, pivotally connected to a base. Preferably, the base is oriented generally perpendicular to the flexible member. Alternatively, the base may be oriented at almost any angle with respect to the flexible member. The arm is generally planar. One end of the arm is pivotally connected to the base. The other end of the arm is in direct contact with the flexible member. The arm is pivotable to form between about a zero degree angle and about a ninety degree angle with respect to the base. Alternatively, based on the position and orientation of the flexible member sensor, the angle may range from about zero degrees and about one-hundred and eighty degrees. Of course, different configurations may allow for still different angle ranges.

The arm communicates with the flexible member such that movement of the flexible member and changes in tension within the flexible member cause the arm to pivot. Movement of the flexible member generally comprises sliding of the flexible member past the arm and/or changes in the direction in which the flexible member is drawn. The flexible member may pass through a passage near the unconnected end of the arm. Alternatively, the flexible member simply slides past the unconnected end of the The flexible member sensor includes a sensor in communication with the arm. The sensor may be mechanically coupled to the arm. Alternatively, the sensor may use an intangible medium such as electromagnetic energy or magnetic flux to detect movement of the arm with respect to the base. The signal may represent a change in position of the aim, an angle between the arm and the base, rotational velocity or acceleration of the arm, or other information relating to pivotal motion of the arm with respect to the base. Thus, the sensor may be an acceleration sensor, a velocity sensor, an angular position sensor, or the like.

In certain embodiments, the flexible member is a length of seat belt webbing and the flexible member sensor is a seat belt webbing sensor incorporated in a feedback control system that controls an electric seat belt retractor designed to take up the seat belt. The feedback control system includes a spool rotatably coupled to a retractor frame. The seat belt webbing is connected to, and wound around the spool.

The seat belt webbing sensor senses tension in the portion of the seat belt extending from the retractor frame. The spool may be rotated about its axis by an electric motor. The tension sensor and motor are electrically connected to a servo amplifier. When the tension sensor measures a change in tension in the seat belt, the tension sensor causes the servo amplifier to provide a corresponding voltage to the motor to adjust the tension in the seat belt until the tension sensor measures a predetermined tension. When the predetermined tension is detected, the motor is deactivated.

Together, the seat belt webbing sensor, servo amplifier, and motor make up a feedback control loop. While control of an electric seat belt retractor is one advantageous application for such a feedback control loop, the feedback control loop may be used in different systems that include a flexible member for which measurement of the tension is desirable. These others systems may also include a servo amplifier and motor for use in a feedback control loop for the system.

The tension sensor continually sends an analog signal to the servo amplifier. The servo amplifier simply amplifies the signal to enable the signal to operate the motor. The analog signal is a signal for activating the motor to adjust the tension in the seat belt. As the motor rotates the spool, the tension in the seat belt is increased or decreased in accordance with the analog signal.

Because the signal is analog and originates from the tension sensor, which is directly measuring even slight changes in tension, the change in tension causes a corresponding change in the signal. Thus, in the absence of other factors affecting the tension of the flexible member, the motor speed is gradually decreased until the predetermined tension is reached. Thus, the feedback control loop provides smooth, precise adjustments to the tension in the seat belt while minimizing or eliminating motion control errors.

In view of the foregoing, the flexible member sensor of the present invention provides substantial advantages over conventional systems. The flexible member sensor measures movement in the flexible member with high sensitivity through direct contact with the flexible member. The flexible member sensor may be used with a wide variety of applications including manufacturing, automated distribution, and vehicle systems.

According to one exemplary application, the flexible member sensor may be used with an electric seat belt retractor to control extraction and retraction of webbing using a feedback control loop. The flexible member sensor may be used to measure changes in the position, acceleration, and/or tension of a seat belt. The flexible member sensor may also be used to activate other safety systems in a vehicle, such as airbags.

These and other features, and advantages of the present invention will become more fully apparent from the following description and appended claims, or may be learned by the practice of the invention as set forth hereinafter.

BRIEF DESCRIPTION OF THE DRAWINGS

In order that the manner in which the advantages and features of the invention are obtained, a more particular description of the invention summarized above will be rendered by reference to the appended drawings. Understanding that these drawings illustrate only selected embodiments of the invention and are not therefore to be considered limiting in scope, the invention will be described and explained with additional specificity and detail through the use of the accompanying drawings in which.

DETAILED DESCRIPTION OF THE PREFERRED EMBODIMENTS

The preferred embodiments of the invention are now described with reference to FIGS. 1 through 5, wherein like parts are designated by like numerals throughout. The members of the present invention, as generally described and illustrated in the Figures, may be constructed in a wide variety of configurations. Thus, the following more detailed description of the embodiments of the system and method of the present invention, as represented in the Figures, is not intended to limit the scope of the invention, as claimed, but is merely representative of presently preferred embodiments of the invention.

In this application, the phrases "connected to," "coupled to," and "in communication with" refer to any form of interaction between two or more entities, including mechanical, electrical, magnetic, electromagnetic, and thermal interaction. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion.

The phrase "directly attached to" refers to a form of attachment by which the attached items are either in direct contact, or are only separated by a single fastener, adhesive, or other attachment mechanism. The term "abutting" refers to items that are in direct physical contact with each other, although the items may not be attached together.

Figure 1:
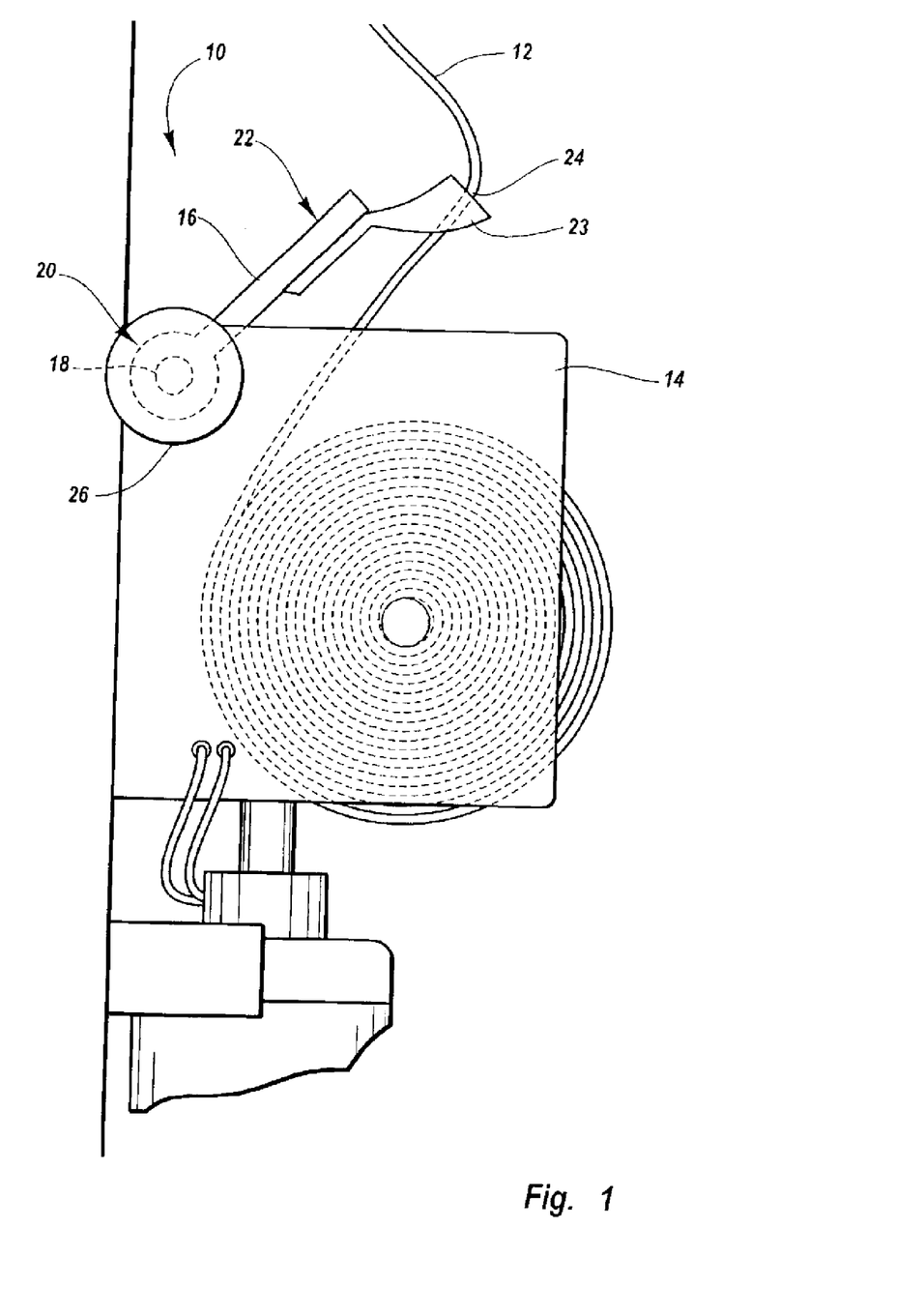
FIG. 1 is a side view of a flexible member sensor according to one embodiment of the invention.

With reference to FIG. 1, there is illustrated a side view of one embodiment of a flexible member sensor 10. As mentioned above, the flexible member sensor 10 may be used in various systems including but not limited to manufacturing, automated distribution, and vehicle systems. For example, the tension in structural cables, conveyer belts, ropes, and the like may be continuously adjusted through the use of the flexible member sensor. The flexible member sensor 10 detects movement and/or changes in tension of a flexible member 12 such as a cable, belt, or rope. The flexible member 12 is illustrated in the form of a belt, by way of example.

The flexible member sensor 10 includes a base 14 for securing the flexible member sensor 10 in relation to the movable flexible member 12. The base 14 may be a rigid rectangular member, as illustrated. Alternatively, the base 14 may be a structure of any shape which anchors the flexible member sensor 10.

The flexible member sensor 10 includes a rigid member 16 such as an arm 16. The arm 16 is pivotally connected to the base 14 by a pivot 18. Preferably, the pivot 18 allows the arm 16 to pivot through at least ninety degrees with respect to the base 14. The pivot 18 may comprise an axle (not shown) which passes through the base 14 and the arm 16.

Generally, the arm 16 is a rigid, planar, rectangular member that includes a pivot end 20 and a contact end 22. Of course, the arm 16 may be in various configurations so long as the arm 16 is rigid or semi-rigid such that movement and changes in tension in the flexible member 12 cause the arm 16 to pivot.

The pivot 18 connects the pivot end 20 to the base 14. The contact end 22 pivots freely about the pivot 18. The contact end 22 directly contacts the flexible member 12. Alternatively, as illustrated in FIG. 1, a keeper 23 is connected to, and extends from, the contact end 22. The keeper 23 includes a hole, or passage 24, through which the flexible member 12 passes. The keeper 23 allows the arm 16 to maintain contact with the flexible member 12. Alternatively, the arm 16 may include a passage (not shown) similar to the passage 24 near the contact end 22 through which the flexible member 12 passes. In yet another alternative, the arm 16 may be configured such that the contact end 22 of the arm 16 directly contacts the flexible member 12 without passage of the flexible member 12 through the contact end 22.

The arm 16 communicates with the flexible member 12 such that movement of the flexible member 12 causes the arm 16 to pivot. Generally, the arm 16 is sized such that the arm 16, or keeper 23, maintains contact with the flexible member 12 as the contour of the flexible member 12 changes. The contour of the flexible member 12 changes in response to changes in the tension in the flexible member 12.

In certain embodiments, the arm 16 is biased towards the flexible member 12. The bias ensures that the arm 16 maintains contact with the flexible member 12. Preferably, a spring 25 (See FIG. 2) incorporated with the pivot 18 biases the arm 16 toward the flexible member 12. Alternatively, the bias may be provided by gravity acting on the arm 16.

The flexible member sensor 10 contacts a portion of the flexible member 12 between the two ends (not shown) of the flexible member 12. Generally, the two ends of the flexible member 12 are secured in some fashion. Changes in the tensile force between the two ends of the flexible member 12 may cause the arm 16 to pivot. In addition, as the flexible member 12 slides past the arm 16, friction between the arm 16 and the flexible member 12 may also cause the arm 16 to pivot. If the flexible member 12 accelerates past the arm 16, this acceleration may accelerate the pivotal motion of the arm 16.

Referring still to FIG. 1, the positioning of the pivot 18 and the length of the arm 16 may affect the sensitivity of the flexible member sensor 10 to movement of the flexible member 12. Generally, the pivot 18 is positioned in the base 14 in close proximity to the flexible member 12. The pivot 18 may allow the arm 16 to move between a position substantially parallel to the flexible member 12 and a position substantially perpendicular to the flexible member 12. The flexible member 12 passes in close proximity to the pivot 18 and traverses the length of the arm 16 before contacting the arm 16, for example, by passing through the passage 24 of the keeper 23. Thus, as the flexible member 12 moves past the arm 16 in either direction, or tension in the flexible member 12 changes, the arm 16 pivots in response.

The rate at which the arm 16 pivots and/or the amount of change in the position of the arm 16 may be used to measure forces acting on the flexible member 12. The flexible member sensor 10 includes a sensor 26 coupled to the arm 16 to detect movement of the arm 16 relative to the base 14. A variety of sensors 26 may be used. The sensor 26 may measure a change the angular position of the arm 16 between a first position and a second position. Alternatively, the sensor 26 may measure the velocity or acceleration of the arm 16 from a first position to a second position. Angular deflection or motion of the arm may be measured with respect to almost any reference line. The sensor 26 may also be digital or analog.

In another alternative, a feature (not shown) designed to translate or move in a different manner with respect to the base 14 may be used in place of the arm 16. A sensor (not shown) that correspondingly measures linear or other motion may then be used in place of the rotary detection provided by the sensor 26.

Returning to the embodiment illustrated in FIG. 1, the sensor 26 provides a signal that corresponds to the movement of the arm 16. For example, if the sensor 26 detects the angular motion of the arm 16, when the angle changes, a signal is provided by the sensor 26 to indicate the change. Alternatively, if the sensor 26 is designed to simply indicate a predetermined position for the arm 16, the signal may not be provided until the arm 16 is in the predetermined position.

The signal may be an electrical signal, an optical signal, a digital signal, a change in an electrical signal such as a drop or rise in voltage, or the like. The nature of the signal may be adapted to suit different applications in which a flexible member sensor is incorporated. In one embodiment, the signal is an analog signal capable of being amplified and used for motor control.

Figure 2:
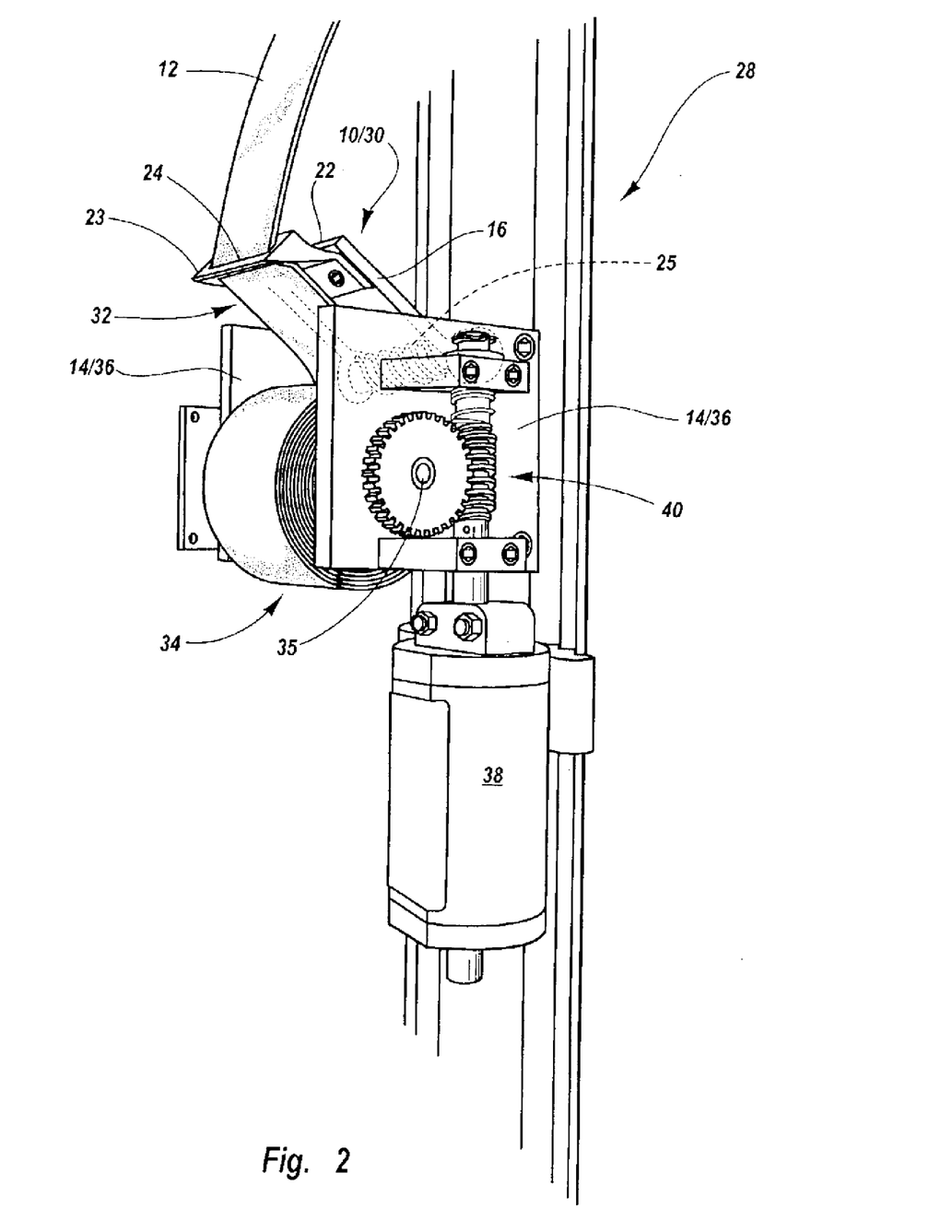
FIG. 2 is a perspective view of a flexible member sensor integrated with an electric seat belt retractor.

FIG. 2 illustrates a flexible member sensor 10 integrated with an electric seat belt retractor 28, or a retractor 28. The retractor 28 provides one specific example of an application in which the flexible member sensor 10 of the invention may be implemented. In the configuration of FIG. 2, the flexible member 12 is a length of seat belt webbing 12, or webbing 12. Generally, the webbing 12 is a flexible textile weave used in most vehicular seat belt systems. The flexible member sensor 10 may also be referred to as a seat belt webbing sensor when used in conjunction with a seat belt retractor.

The flexible member sensor 10 is integrated with a web guide 32 for the retractor 28. The web guide 32 untwists and aligns the webbing 12 with a spool 34 of the retractor 28 such that the webbing 12 may be properly extracted and retracted. In this embodiment, the flexible member sensor 10 serves as a tension sensor 30 for detecting changes in tension in the webbing 12 extending from the spool 34. The retractor frame 36 provides a base 14 for the sensor 10.

The retractor 28 includes an electric motor 38 coupled to the spool 34 for rotating the spool 34 in either direction about an axis 35. The motor 38 may be a direct current (DC) motor. The electric motor 38 may be coupled to the spool 34 using a gear system 40, which may be configured in a variety of ways. The electric motor 38 rotates the spool 34 to pay out and retract the webbing 12 as needed. Generally, one end of the webbing 12 is anchored to the vehicle outside the retractor 28. The remainder of the webbing 12 passes through a latch plate or buckle and a D-ring before being wound around the spool 34.

The flexible member sensor 10 may control the operation of the electric motor 38 via movement of the web guide 32. For example, if tension in the seat belt webbing 12 causes the web guide 32 to extend away from the retractor 28, the flexible member sensor 10 activates the motor 38 to pay out the webbing 12. Similarly, if the tension in the webbing 12 causes the web guide 32 to pivot toward the retractor 28, the flexible member sensor 10 activates the motor 38 to retract the webbing 12.

The retractor 28 may be used for either the driver's side or the passenger's side of the vehicle. Due to the use of the flexible member sensor 10, the retractor 28 maintains about the same level of tension to seat belt webbing 12 in any location within a vehicle. If desired, the retractor 28 may also be used with certain types of lap belts.

Figure 3:
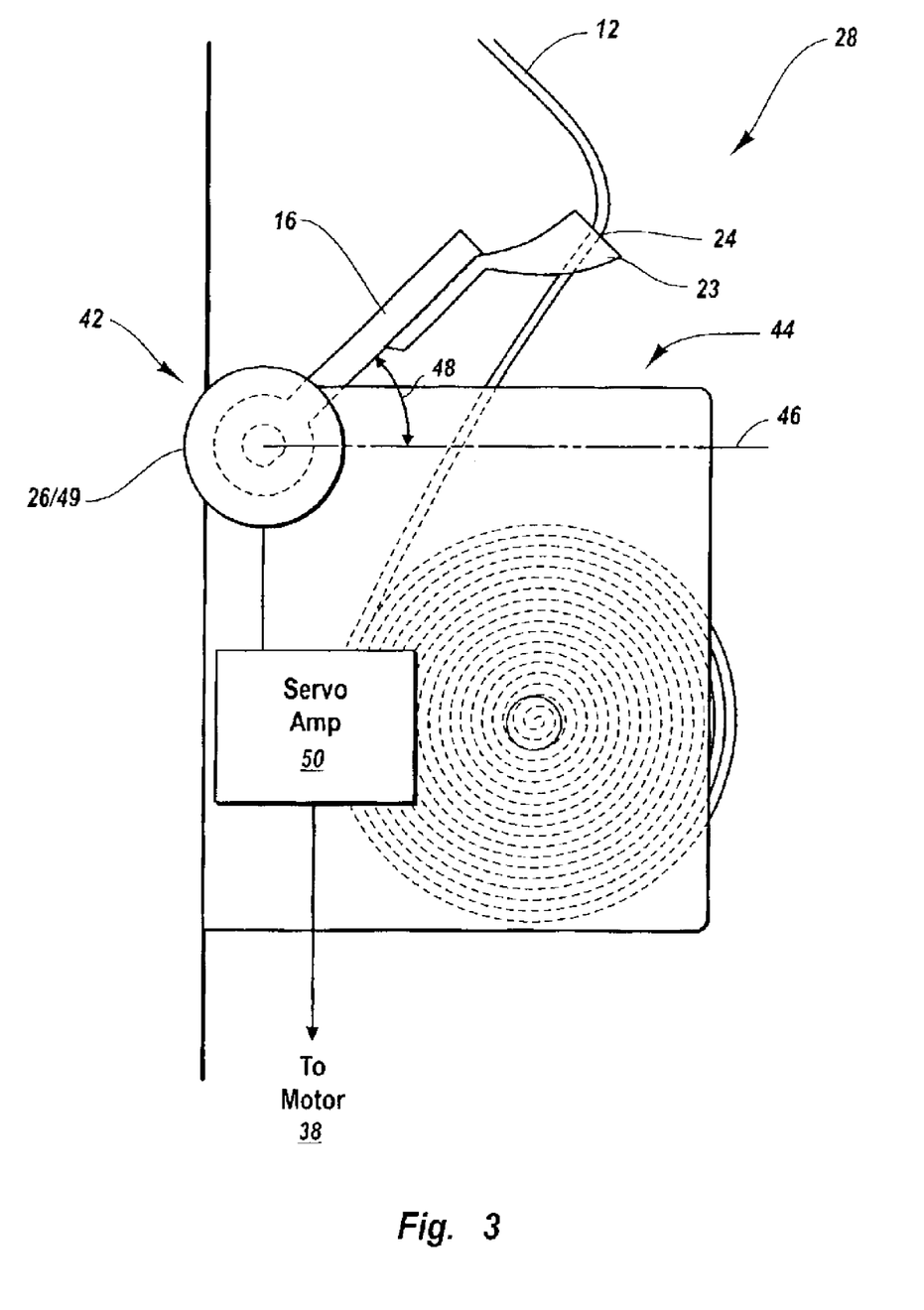
FIG. 3 is a side view of a flexible member sensor used in a feedback control system for operating an electric seat belt retractor.

FIG. 3 illustrates a side view of a feedback control system 42 which includes the flexible member sensor 10, as incorporated in the electric seat belt retractor 28 illustrated in FIG. 2. Normal operation of the electric retractor 28 is controlled by the flexible member sensor 10. During an emergency, the flexible member sensor 10 may be overridden to provide emergency locking of the retractor 28.

The flexible member sensor 10 may be connected to the retractor frame 36 (the base 14) near a belt opening 44. The belt opening 44 is the side of the retractor frame 36 where the webbing 12 enters the retractor 28. The base 14 may run substantially perpendicular (as indicated by reference line 46) to the webbing 12 exiting the retractor 28.

The flexible member sensor 10 may detect tension in the webbing 12 using an angular sensor 26 which is mechanically coupled to the arm 16. As discussed above, the arm 16 pivots in response to changes in tension in the webbing 12. Preferably, the angular sensor 26 is an analog sensor that provides a signal that varies in magnitude based on the position of the arm 16 relative to the base 14. Alternatively, a different signal may be provided based on the position of the arm 16. The signal provided directly corresponds to the position of the arm 16.

Alternatively, different sensors 26 may be used and the sub-components and communication between the sensor 26 and the arm 16 may vary. The sensor 26 may be connected to the arm 16, the pivot 18, or the base 14. The sensor 26 may measure movement of the arm 16 without a direct connection to the arm 16. For example, the sensor 26 may detect changes in a magnetic field, refracted light rays, or the like. Alternatively, the sensor 26 may measure acceleration of the arm 16 about the pivot 18 between a first position and a second position.

To facilitate an understanding of the operation of the angular sensor 26, references are made herein to an angle 48. The angle 48 generally represents the angle between the arm 16 and the base 14, identified generally by the reference line 46. In the embodiment of FIG. 3, the angular sensor 26 detects movement of the arm 16 between a first position approximately parallel with the base 14 (and the reference line 46), to a second position approximately parallel to the webbing 12 and perpendicular to the reference line 46.

The angular sensor 26 need not directly measure the angle 48 between the base 14 and the arm 16. However, alternative flexible member sensors may use a sensor that does directly measure such an angle 48. In this specification, exemplary magnitudes and ranges of the angle 48 may be referred to for illustration and clarity. Those of skill in the art understand that the flexible member sensor 10 may be configured to use a variety of different magnitudes and/or angle ranges of the angle 48.

The sensor 26 may comprise a potentiometer 49 coupled to the arm 16. Alternatively, the potentiometer 49 may be coupled to the pivot 18. In one embodiment, the potentiometer 49 is a rotary linear taper potentiometer. An axle (not shown) of the potentiometer 49 may be connected to the pivot 18. Movement of the arm 16 moves a wiper (not shown) within the potentiometer 49 to vary a voltage provided to the motor 38.

The potentiometer 49 may be in electrical communication with a servo amplifier 50. The servo amplifier 50 may be a voltage amplifier that amplifies the voltage output of the potentiometer prior to transmission of the voltage to the motor 38. Thus, the servo amplifier 50 provides a voltage to the motor 38 that corresponds to a signal from the potentiometer 49.

In one embodiment, the potentiometer 49 provides a linear gradation in output voltage as the arm 16 pivots through an angle 48 of between about zero degrees to about ninety degrees. At one point within the aforementioned angular range, the output voltage may cross a zero point to provide a change in output voltage potential. Voltages of one polarity may be retraction voltages that activate the motor 38 to retract the webbing 12, and voltages of the opposite polarity may be extraction voltages that activate the motor 38 to pay out the webbing 12.

If desired, the point at which the output voltage is zero may correspond to an angle 48 of about forty-five degrees. Thus, the motor 38 is deactivated when the angle 48 is about forty-five degrees. Generally, a certain amount of tension (referred to herein as the predetermined tension) is present in the webbing 12 to cause the arm 16 to maintain an angle 48 of about forty-five degrees. When the angle 48 is greater than or less than forty-five degrees, the motor 38 receives voltage and operates accordingly.

More precisely, when tension in the seat belt webbing 12 extends the arm 16 to an angle 48 of between about forty-five degrees and about ninety degrees, the wiper within the potentiometer 49 moves along a conductor (not shown) such that an extraction voltage is provided to the amplifier 50. As mentioned above, forty-five degrees and ninety degrees are examples. Generally, as the arm 16 moves from about forty-five degrees to about ninety degrees, the magnitude of the extraction voltage gradually increases.

Similarly, when tension in the webbing 12 extends the arm 16 to an angle 48 of between about zero degrees and about forty-five degrees, the wiper within the potentiometer 49 moves to provide a retraction voltage to the amplifier 50. Generally, as the arm 16 moves from about zero degrees to about forty-five degrees, the magnitude of the extraction voltage gradually decreases. Tension in the webbing 12 may change in response to occupant use of the seat belt system and/or activation of the motor 38 to retract and extract the webbing 12.

Those of skill in the art recognize that the angle ranges for providing a retraction voltage and extraction voltage may be varied and/or reversed depending on the implementation. For example, retraction voltages may be provided for an angle 48 between about zero and twenty degrees and extraction voltages may be provided for an angle 48 between about thirty-five and sixty degrees.

As mentioned previously, when the tension in the webbing 12 is at a predetermined level (the "predetermined tension"), the angle 48 remains at about forty-five degrees, thereby producing no voltage and no corresponding motor operation. The predetermined tension is an amount of tension in the webbing 12 which allows a seat belt system to properly protect an occupant without causing occupant discomfort.

Generally, the predetermined tension is determined by the position of the pivot 18, the length of the arm 16, and the design of the potentiometer 49. In certain embodiments, a torsional spring 25 (See FIG. 2) in communication with the arm 16 biases the arm 16 towards the belt opening 44. The bias of the spring 25 may also affect the magnitude of the predetermined tension. The predetermined tension may be between about two and about four Newtons.

Referring still to FIG. 3, operation of the feedback control system 42 will now be described. Initially, the arm 16 extends over the belt opening 44 because minimal tension is in the webbing 12. When power is provided to the system 42, such as by starting a vehicle, the sensor 26 detects that the arm 16 is between about zero and about forty-five degrees. In response, the sensor 26 provides a retraction voltage to the servo amplifier 50.

The servo amplifier 50 may be a conventional bridge amplifier that provides an amplified voltage in response to an input voltage provided by the sensor 26. The amplifier 50 takes the input voltage and provides a corresponding output voltage of the same polarity but with a higher magnitude. The input voltage is amplified to the level needed to activate the motor 38. For example, in one embodiment the voltage is amplified by a factor of ten. Output voltage of one polarity, for example, positive, activates the motor 38 to rotate the spool 34 in a direction for extraction of the webbing 12. Similarly, output voltages in the opposite polarity activate the motor 38 to rotate the spool 34 in a direction for webbing 12 retraction.

In response to a retraction voltage from the sensor 26, the servo amplifier 50 provides an amplified retraction voltage to the motor 38. The voltage change activates the motor 38 to retract the webbing 12. If the seat belt webbing 12 is not in use, retraction of the webbing 12 by the motor 38 causes the arm 16 to extend above the belt opening 44 until the arm 16 forms about a forty-five degree angle 48. As the arm 16 approaches forty-five degrees, the sensor 26 may gradually provide less retraction voltage. As mentioned above, when the arm 16 is at about forty-five degrees, substantially no voltage is provided by the sensor 26, and thus, the motor 38 is deactivated until a change in the tension of the webbing 12 occurs.

Similarly, if high tension is present in the webbing 12, for example due to an occupant pulling the webbing 12 out of the retractor 28, the increased tension causes the arm 16 to pivot and form about a ninety degree angle 48. In response, the sensor 26 provides an extraction voltage to the servo amplifier 50. The servo amplifier 50 provides the corresponding output voltage to activate the motor 38 to rotate the spool 34 to extract webbing 12. As more webbing 12 is extracted, the tension decreases. In response, the arm 16 pivots to bring the angle 48 back toward about forty-five degrees. Preferably, as the arm 16 moves towards forty-five degrees, the extraction voltage and corresponding output voltage also gradually decrease. A gradual change in the voltage causes the motor 38 to gradually slow until it stops when the angle 48 reaches about forty-five degrees.

FIGS. 2 and 3 illustrate the flexible member sensor 10 integrated with the seat belt retractor 28. However, in alternative embodiments, the flexible member sensor 10 may be disposed separate from the seat belt retractor 28. Furthermore, the flexible member sensor 10 may be used to control other systems besides, or in addition to, the seat belt retractor 28. For example, tension, acceleration, and/or other movement of the webbing 12 may be monitored by the flexible member sensor 10 for activation of various vehicular safety systems such as airbags.

Figure 4:
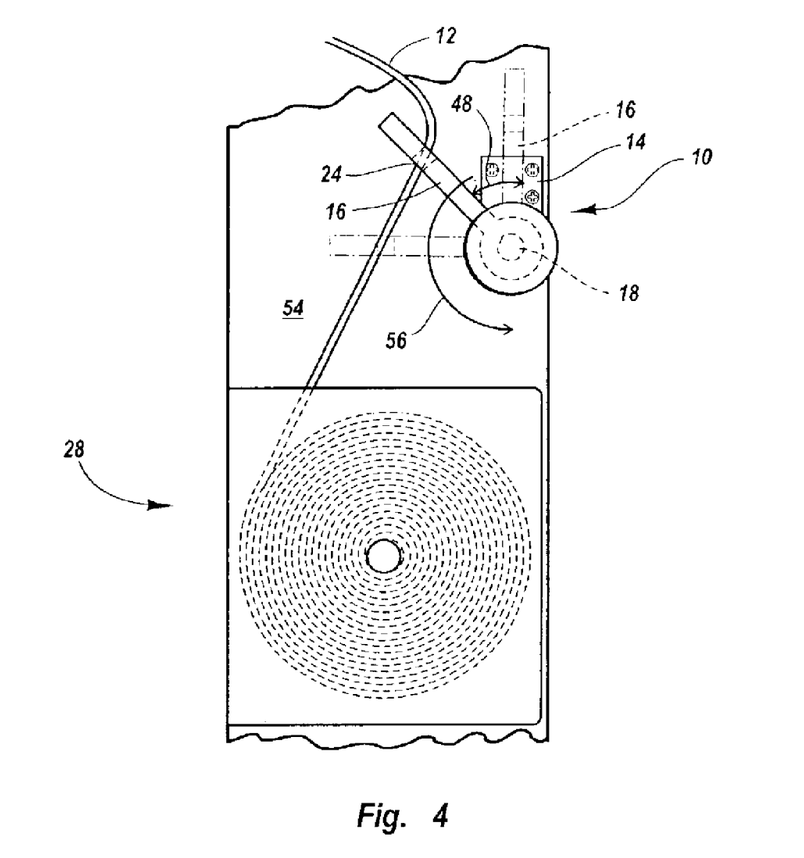
FIG. 4 is a perspective view of an alternative orientation of one embodiment of a flexible member sensor.

FIG. 4 illustrates an embodiment of the flexible member sensor 10 having a different orientation and/or configuration. For example, in FIG. 4, the flexible member sensor 10 may be secured to a vehicle pillar 54 (B-pillar, C-pillar, or the like) via a base 14 screwed, welded or otherwise secured to the pillar 54. Alternatively, the base 14 may comprise a securing member (not shown) integrated with the pivot 18.

In the depicted embodiment, the positions of the arm 16, which activate a retractor 28 to extract and retract the webbing 12, may be different because of the position and orientation of the sensor 10. For example, the pivot 18 may allow the arm 16 to pivot through one-hundred and eighty degrees, as indicated by an arrow 56. A spring 25 (See FIG. 2) may bias the arm 16 to urge the arm 16 to rotate generally upward, in the a direction opposite to that of the arrow 56.

In this configuration, the predetermined tension may be tension which allows the spring 25 to pivot the arm 16 to about an eighty-five degree angle 48. Accordingly, the range of angles which cause the sensor 10 to activate the retractor 28 for extraction and retraction may be, respectively, between about eighty-five degrees and about one-hundred and eighty degrees, and between about eighty-five degrees and about zero degrees. As mentioned above, different angle ranges may be used within the scope of the present invention.

Conventional motion control systems include a controller which sends control signals to the motor to achieve a desired motion. The motor is coupled to a load such that activation of the motor actuates the load. Inertia, friction, and other forces can cause the motor to overshoot or undershoot the desired position, velocity, acceleration, or other characteristic of the load. To overcome such motion control errors, a conventional motion control system measures the operation of the motor to infer what adjustments need to be made to obtain the desired load motion. New signals are sent to the motor to provide correction.

Unfortunately, such correction methods are typically somewhat inaccurate. In the course of adjustment, the load may move in a manner that overshoots or undershoots the desired adjustment. As a result, many motor adjustments may be required to provide the desired load motion, thereby requiring further adjustment and adding to the time required to obtain the desired load motion characteristics. The present invention provides feedback control systems that more accurately obtain the desired load motion. One example of such a feedback control system will be shown and described in connection with FIG. 5.

Figure 5:
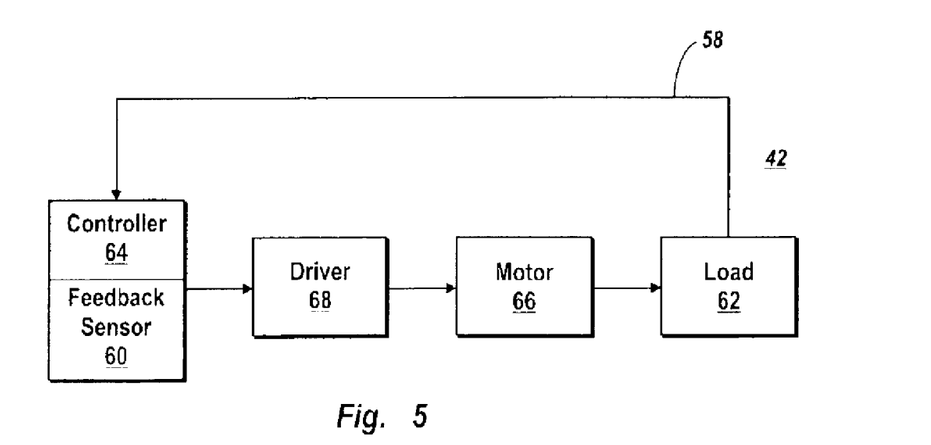
FIG. 5 is a functional flow diagram of a feedback control system including a flexible member sensor according to the present invention.

Referring now to FIG. 5, a functional flow diagram of the feedback control system 42 is illustrated. The feedback control system 42 illustrates the operation of a sensor according to the invention, such as the flexible member sensor 10 described previously. Instead of a servo control loop which includes a sensor on the motor, the feedback control system 42 includes a load feedback control loop 58. In a load feedback control loop 58, a feedback sensor 60 measures and reports movements of the load 62, rather than dynamics of the motor. A load feedback control loop 58 uses the load motion information to substantially eliminate motion control errors. Motor characteristics such as angular position, velocity, and acceleration need not even be measured.

Generally, the feedback control system 42 includes a controller 64, a motor 66, a load 62, and a feedback sensor 60. The controller 64 and motor 66 may be of various conventional designs. The load 62 may be almost any object which is to be moved by the feedback control system 42. The feedback sensor 60 may be one of various sensors designed to measure one or more aspects of movement of the load 62 such as position, velocity, or the like.

The feedback sensor 60 may be in direct communication with the load 62 such that subtle changes in dynamics of the load 62 may be detected and reported. The feedback sensor 60 and the controller 64 for the system 42 may be integrated into a single unit. Alternatively, the controller 64 and feedback sensor 60 may be separate, independent components.

The load feedback control loop 58 comprises a control flow from the controller 64 to the motor 66, which actuates the load 62, plus the feedback of information about movement of the load 62, provided by the feedback sensor 60 to the controller 64. The feedback information allows the controller 64 to signal the motor 66 to provide precise and accurate movement of the load 62. In one embodiment, the feedback sensor 60 comprises an analog sensor which provides a variable signal in response to movement of the load 62.

Generally, the feedback control system 42 includes a driver 68 that receives the signal provided by the controller 64. The driver 68 may change the signal in order to activate the motor 66. Preferably, the driver 68 boosts the strength of the control signal by increasing the current and/or voltage. For example, the driver 68 may comprise a servo amplifier that simply increases the magnitude of the signal from the controller 64. Alternatively, the driver 68 may replace the control signal with a corresponding activation signal for the motor 66.

Referring now generally to FIGS. 1–4 in conjunction with FIG. 5, the feedback control system 42 and load feedback control loop 5.8 may be implemented using an electric seat belt retractor 28 that includes the flexible member sensor 10. For example, the seat belt webbing 12 may comprise the load 62. The motor 38 of the electric seat belt retractor 28 may comprise the motor 66. The servo amplifier 50 may comprise the driver 68. The flexible member sensor 10 may comprise both the feedback sensor 60 and the controller 64.

Operation of the load feedback control loop 58 in an electric seat belt retractor 28 will now be described. The electric seat belt retractor 28 may initially be in a stable state, meaning a predetermined tension is present in the webbing 12 and the motor 38 is deactivated. If the webbing 12 is pulled or released, changing the tension, the flexible member sensor 10 detects the change almost instantaneously because the flexible member sensor 10 is in direct contact with the webbing 12.

In response to the change in tension, the arm 16 pivots and the sensor 26 provides a particular voltage to the servo amplifier 50. The voltage has a polarity for properly extracting or retracting the webbing based on the change in tension. The servo amplifier 50 amplifies the voltage to a level that will activate the motor 38. The activated motor 38 rotates the spool 34 in the appropriate direction to either extract or retract the webbing 12. The flexible member sensor 10 detects movement of the webbing 12 by the motor 38. In response, the flexible member sensor 10 gradually adjusts the control signal (the voltage magnitude) sent to the motor 38 until the predetermined tension is again present in the webbing 12.

In summary, the load feedback control loop 58 and the flexible member sensor 10 provide advantages over conventional systems. The load feedback control loop 58 allows an electric seat belt retractor 28 to gradually extract and retract the webbing 12 without overshoot or undershoot motion control errors. Furthermore, because the flexible member sensor 10 senses tension directly from the webbing 12, the feedback control system 42 is automatically calibrated for use in almost any seat belt system. Direct sensing by the flexible member sensor 10 allows the retractor 28 to quickly respond to motion of the webbing 12. In addition, the analog load feedback control loop 58 allows the system 42 to operate without complicated or expensive control modules.

Such a feedback control system 42 may be utilized in a wide variety of control systems in which a load is to be moved with speed and precision. For example, the feedback control system 42 may be used in manufacturing, automated distribution, vehicle systems, and a wide variety of other applications. The feedback control system 42 may provide particular benefits in systems in which the tension of a flexible member such as a belt, cable, or the like, is to be continuously adjusted. Adaptation of the feedback control systems described above to such applications is within the ability of those of skill in the art with the aid of the present disclosure.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. A flexible member sensor, comprising:
    a rigid member pivotally connected to a retractor frame, wherein seat belt webbing is retracted into and extracted from the retractor frame;
    a sensor in communication with the rigid member to detect movement of the rigid member relative to the retractor frame, the sensor providing a signal corresponding to movement of the rigid member;
    wherein the rigid member communicates with the seat belt webbing such that changes in tension within the seat belt webbing cause the rigid member to pivot to a position substantially perpendicular to the seat belt webbing when there is substantially no tension in the seat belt webbing and pivots away from a perpendicular angle with the seat belt webbing when there is tension in the seat belt webbing.

2. The flexible member sensor of claim 1, wherein the rigid member comprises an arm having a pivot end and a contact end and wherein the seat belt webbing contacts the arm at the contact end and traverses the length of the arm to pass in close proximity to the pivot end.

3. The flexible member sensor of claim 2, wherein the contact end comprises a passage through which the seat belt webbing is threaded.

4. The flexible member sensor of claim 1, further comprising a spring that biases the rigid member to pivot towards the retractor frame.

5. The flexible member sensor of claim 1, wherein the sensor comprises an angular sensor that provides the signal based on the position of the rigid member relative to the retractor frame.

6. The flexible member sensor of claim 1, wherein the sensor detects acceleration of the rigid member from a first position to a second position and provides a corresponding signal based on the acceleration.

7. The flexible member sensor of claim 1, wherein the signal controls retraction and extraction of the seat belt webbing in an electric seat belt retractor.

8. The flexible member sensor of claim 1, wherein the sensor is integrated with a guide for the seat belt webbing.

9. The flexible member sensor of claim 1, wherein the sensor is mechanically coupled to the rigid member.

10. A feedback control system for controlling an electric seat belt retractor comprising:
    a spool connected to seat belt webbing wound around the spool, the spool being rotatable about an axis fixed within a retractor frame, wherein the retractor frame comprises a belt opening at one end of the retractor frame which allows extraction and retraction of the seat belt webbing from the retractor;
    a tension sensor in communication with a portion of the seat belt webbing that extends from the retractor frame, the tension sensor measuring tension in the seat belt webbing between the extended portion and the spool, wherein the tension sensor comprises an arm, one end of the arm being pivotally attached to the retractor frame, wherein the arm extends over the belt opening and pivots to substantially cover the belt opening when there is substantially no tension in the seat belt webbing and pivots to about a ninety degree angle with respect to the belt opening when tension in the seat belt webbing causes the seat belt webbing to extend substantially perpendicular to the retractor frame;
    an electric motor coupled to the spool to rotate the spool about the axis; and
    a servo amplifier electrically connected to the tension sensor and the electric motor such that a change in tension measured by the tension sensor causes the servo amplifier to provide a corresponding voltage to the motor which adjusts tension in the seat belt webbing until a predetermined tension is measured by the tension sensor.

11. The feedback control system of claim 10, wherein the tension sensor comprises:
    the other end of the arm having a webbing passage through which the portion of the seat belt webbing extending from the belt opening is threaded.

12. The feedback control system of claim 10, wherein when the arm pivots to form an angle with the belt opening of between about zero and about forty-five degrees, the tension sensor provides a retraction voltage to the servo amplifier such that the motor is activated to retract the seat belt webbing onto the spool.

13. The feedback control system of claim 10, wherein when the arm pivots to form an angle with the belt opening of between about forty-five degrees and about ninety degrees, the tension sensor provides an extraction voltage to the servo amplifier such that the motor is activated to extract the seat belt webbing from the spool.

14. The feedback control system of claim 10, wherein when the arm pivots to form an angle with the belt opening of about forty-five degrees, the tension sensor provides no voltage to the servo amplifier such that the motor is deactivated.

15. The feedback control system of claim 10, wherein the tension sensor comprises a potentiometer that provides a retraction voltage, an extraction voltage and substantially no voltage based on the position of the arm with respect to the belt opening.

16. The feedback control system of claim 10, wherein the tension sensor comprises a spring which biases the arm towards the belt opening.

17. The feedback control system of claim 10, wherein the tension sensor is a web guide for the electric seat belt retractor.

18. The feedback control system of claim 10, wherein the servo amplifier is a voltage amplifier.

19. The feedback control system of claim 10, wherein the predetermined tension is between about two Newtons and about four Newtons.

20. A feedback control system for controlling an electric seat belt retractor comprising:
- a spool connected to a seat belt webbing wound around the spool, the spool being rotatable about an axis fixed within a retractor frame;
- a direct current electric motor coupled to the spool to rotate the spool about the axis;
- a web guide pivotally connected to a belt opening of the retractor frame, the web guide being in communication with the seat belt webbing such that tension in the seat belt webbing extending from belt opening causes the web guide to pivot with respect to the retractor frame; and
- a servo amplifier electrically connected to the web guide and the electric motor, the servo amplifier receiving an input voltage from the web guide, the input voltage being determined by the angular position of the web guide with respect to the belt opening, wherein the servo amplifier provides an output voltage to the motor to adjust the tension in the seat belt webbing in response to the input voltage.

21. The feedback control system of claim 20, wherein the web guide comprises:
- an arm which extends from the belt opening, the arm being pivotally attached to the retractor frame, the other end of the arm having a webbing passage through which a portion of the seat belt webbing extending from the belt opening is threaded;
- wherein the arm pivots to substantially cover the belt opening when there is substantially no tension in the seat belt webbing and pivots to about a ninety degree angle with respect to the belt opening when there is tension in the seat belt webbing extending from the retractor frame.

22. The feedback control system of claim 21, wherein when the arm pivots to form an angle with the belt opening of between about zero and about fort-five degrees, the input voltage to the servo amplifier producing an output voltage which activates the motor to retract the seat belt webbing onto the spool.

23. The feedback control system of claim 22, wherein when the arm pivots to form an angle with the belt opening of between about forty-five degrees and about ninety degrees, the input voltage to the servo amplifier producing an output voltage which activates the motor to extract the seat belt webbing from the spool.

24. The feedback control system of claim 23, wherein when the arm pivots to form an angle with the belt opening of about forty-five degrees, the input voltage to the servo amplifier producing an output voltage of about zero volts such that the motor is deactivated.

25. The feedback control system of claim 23, wherein the amount of tension in the seat belt webbing which causes the motor to be deactivated is between about two Newtons and about four Newtons.

26. The feedback control system of claim 20, wherein the web guide comprises a potentiometer that provides an input voltage to the servo amplifier which varies based on the angular position of the web guide with respect to the belt opening.

27. The feedback control system of claim 26, wherein the web guide is connected by a pivot to the retractor frame and the potentiometer is connected to the pivot such that movement of the web guide about the pivot varies the voltage provided by the web guide to the servo amplifier.

28. The feedback control system of claim 20, wherein the angular position of the web guide with respect to the belt opening determines the magnitude and the polarity of the input voltage.

29. The feedback control system of claim 20, wherein the web guide comprises a spring which biases the arm towards the belt opening.

30. The feedback control system of claim 20, wherein the servo amplifier is a voltage amplifier.

31. A feedback control system for controlling an electric seat belt retractor comprising:
- a spooling means for spooling and paying out seat belt webbing for a seat belt retractor;
- a power means coupled to the spooling means for automatically paying out and retracting seat belt webbing from the seat belt retractor; and
- a sensor means in communication with the seat belt webbing for continuously sensing tension in the seat belt webbing, the sensor means being in communication with the power means such that when tension in the seat belt webbing is outside a predetermined range the sensor means provides a signal to directly and continuously adjust the power means to adjust the tension in the seat belt webbing until the tension is within the predetermined range.

32. A feedback control system of claim 31, wherein the predetermined range is between about two Newtons and about four Newtons.

* * * * *